Dec. 16, 1952 D. J. BAKER 2,622,156

PICKUP HEAD WITH REMOVABLE ARMATURE AND STYLUS ASSEMBLY

Filed Jan. 27, 1949 3 Sheets-Sheet 1

INVENTOR.
DONALD J. BAKER
BY Ralph B. Stewart
ATTORNEY

PICKUP HEAD WITH REMOVABLE ARMATURE AND STYLUS ASSEMBLY

Filed Jan. 27, 1949 3 Sheets-Sheet 2

INVENTOR.
DONALD J. BAKER
BY Ralph B. Stewart
ATTORNEY

Dec. 16, 1952 D. J. BAKER 2,622,156

PICKUP HEAD WITH REMOVABLE ARMATURE AND STYLUS ASSEMBLY

Filed Jan. 27, 1949 3 Sheets-Sheet 3

INVENTOR
DONALD J. BAKER
BY Ralph B. Stewart
ATTORNEY

Patented Dec. 16, 1952 2,622,156

UNITED STATES PATENT OFFICE 2,622,156

PICKUP HEAD WITH REMOVABLE ARMATURE AND STYLUS ASSEMBLY

Donald J. Baker, Los Angeles, Calif.

Application January 27, 1949, Serial No. 73,084

18 Claims. (Cl. 179—100.41)

This invention relates to a pickup head of the magnetic type embodying a stylus carried by a movable armature.

The main object of the invention is to devise a pickup head structure in which the armature and stylus mounting structure is formed as a unitary assembly which may be easily and quickly removed and replaced by a new assembly.

In the early development of pickup heads, some rather cumbersome arrangements were devised to permit the stylus or needle to be replaced, and such arrangements usually involved a chuck carried by the armature and a clamping screw for holding the needle in the chuck. These elements added considerable weight to the moving system which was objectionable.

With the advent of high fidelity recording, pickup heads have been developed in which the chuck and clamping screw have been eliminated in order to reduce the mass of the moving system, and generally the high fidelity pickup heads employed solid styli permanently mounted or secured to the armature. These high fidelity heads are of such small size and delicate construction that no attempt was made to make it possible for the ordinary user to replace the styli, since this would require considerable skill found only in a jeweler or skilled craftsman. Accordingly, in case of damage to the stylus, the entire pickup head had to be returned to the factory for repair.

In my present invention, the structure by which the armature and the stylus are suspended in the pickup is formed as a unitary structure which may be quickly removed from the pickup head and without any special skill. My invention makes it possible for the ordinary user to substitute a new armature and stylus suspension for one that has become damaged without returning the pickup to the manufacturer.

Another feature of my invention is that the removable armature suspension is seated in an indexing recess formed in the pickup head casing to insure proper positioning of the armature, and the replaceable assembly may be removed simply by removing a single screw which is readily accessible.

In one form of my invention, the armature is mounted in the center of a mounting disk formed of rubber or other suitable flexible material which also serves to prevent dirt, iron filings and other foreign matter from entering into the spaces between the armature and the pole pieces. In this form of my invention, the flexible disk is embodied in the removable assembly so that the assembly may be replaced should the disk become hardened or cracked with age or for other reasons.

A more general object of my invention is to devise a pickup head of high fidelity, of simple construction, and one that is easy to manufacture and assemble.

Different forms of my invention are illustrated in the accompanying drawings on a greatly enlarged scale.

In the drawings,

Figures 9 to 14 illustrate a second form of my invention in which

Figure 9 is a top plan view of the pickup head;

Figure 10 is a sectional view of Figure 9 taken along the line 10—10;

Figure 11 is a plan view of the magnet used in Figures 9 and 10;

Figure 12 is a sectional view of Figure 11 taken along the line 12—12 and showing the winding spool positioned below the magnet;

Figure 13 is a bottom view of the removable armature assembly of Figures 9 and 10; and Figure 14 is a side elevational view of Figure 13.

Figure 15:
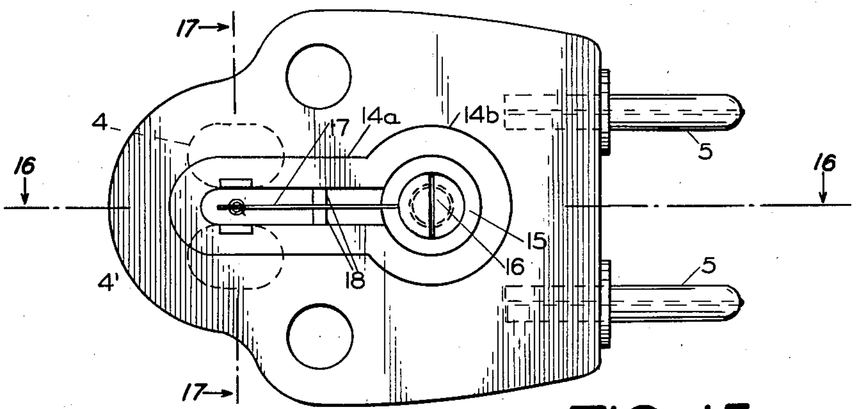
Figure 16:
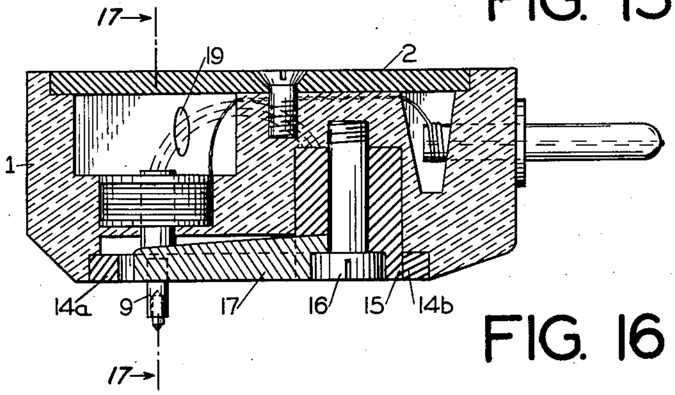
Figure 17:
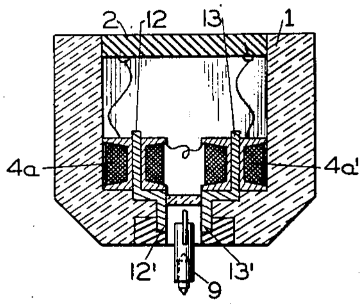

A third form of the invention is illustrated in Figures 15 to 17 in which

Figure 15 is a bottom view of the pickup head;

Figure 16 is a sectional view of Figure 15 taken along the line 16—16; and

Figure 17 is a sectional view of Figure 16 taken along the line 17—17.

Figure 18:
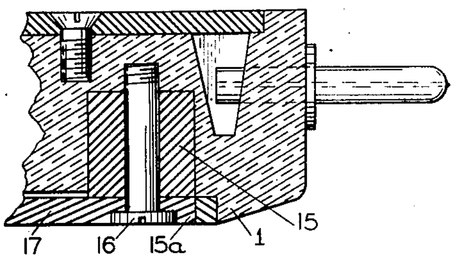
Figure 19:
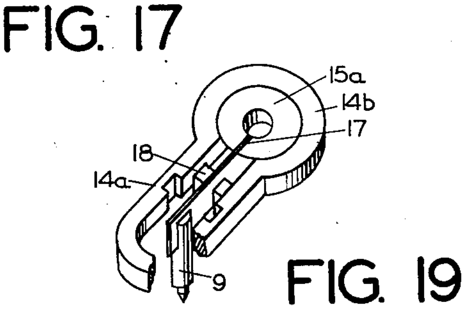

Another modification is illustrated in Figures 18 and 19 in which

Figure 18 is a fragmentary sectional view showing a modified form of removable armature mounting assembly; and Figure 19 is a perspective view illustrating the modified arrangement of Figure 18.

Referring to Figures 1 to 8 of the drawing, the pickup head is provided with a casing 1 preferably formed of molded plastic material and having a cavity 1a in the upper face thereof for receiving certain parts of the pickup, and a cavity 1b in the lower face for receiving the replaceable armature assembly. The cavity in the upper face of the casing is covered by a cover 2 fitting into a recess formed in the casing and held in position by a screw 2b having threaded engagement with a metallic block 3 which is molded into an upstanding boss 1c formed integrally with the casing at the time the casing is molded. The casing is provided with a pair of holes 1d and 1e for receiving mounting screws not shown.

A downwardly extending boss 2a is formed on the lower face of cover 2, and a winding spool 4 is supported at the lower end of this boss by means of a mounting stem 4a on the spool extending into a cavity in the boss 2a. A pickup coil 4b is wound on the spool 4 and connected to a pair of terminals 5 mounted at the rear end of the casing 1. The winding spool 4 is formed of non-magnetic material, such as brass, although it may be formed of plastic material. If formed of metal, the spool and its mounting stem are slotted as shown at 4c in Figure 3 to prevent the formation of eddy currents.

Figure 1:
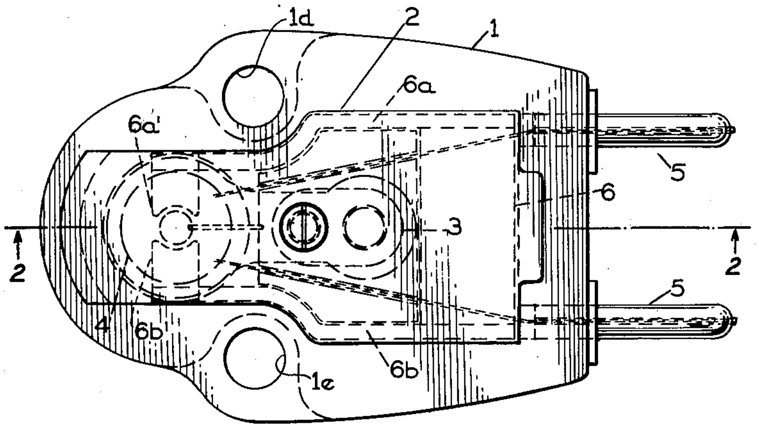
Figure 1 is a top or plan view of one form of my pickup head.
Figure 3:
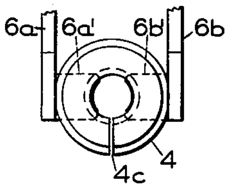
Figure 3 is a plan view of the winding spool showing the pole pieces associated therewith.
Figure 5:
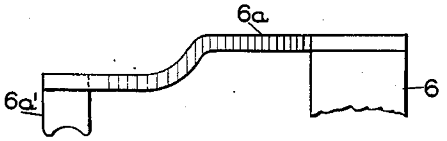
Figure 5 is a plan view of a part of the magnet and one pole piece.
Figure 6:
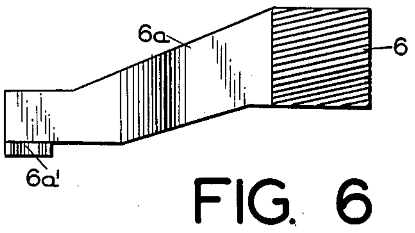
Figure 6 is an elevational view of Figure 5.

A permanent magnet 6 is mounted in the rear end of cavity 1a transversely of the pickup head, and a pair of elongated pole pieces 6a and 6b are arranged with their rear ends in contact with opposite end faces of the magnet 6 and extend forwardly and downwardly to a position on opposite sides of the spool 4, and these two pole pieces are provided with inwardly extending pole tips 6a′ and 6b′ which have their opposing faces formed with a concave surface to provide an air gap of generally round shape between the two pole tips, see Figures 1 and 3. The shape of the pole piece 6a in contact with one of the poles of magnet 6 is shown in Figures 5 and 6, and the pole piece in contact with the other pole of magnet 6 will be of the same shape but reversed.

Figure 2:
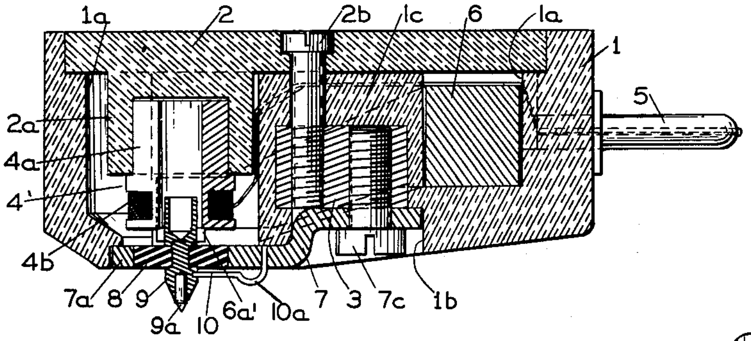
Figure 2 is a sectional view of Figure 1 taken along the line 2—2.
Figure 4:
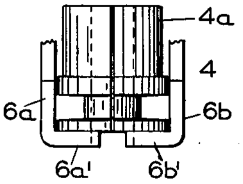
Figure 4 is a front elevational view of Figure 3.

The arrangement for mounting the magnetic armature within the air gap between the pole tips 6a′ and 6b′ includes an armature frame 7, preferably formed as a metal strap having an enlarged ring-shaped portion 7a at the front and a perforated rear end 7b. The strap 7 is securely mounted in the cavity 1b formed in the lower face of the casing 1 by means of a mounting screw 7c having threaded engagement with the metal insert 3. A disk 8 of flexible material, such as rubber, is mounted within the ring portion 7a and serves as a flexible mounting for the magnetic armature 9 which has a reduced portion passing through an aperture formed in the center of disk 8. As shown in Figures 1 and 2, the upper end of the armature 9 is positioned between the pole tips 6a′ and 6b′ and extends into the spool 4 carrying the pickup coil 4b. Preferably, the upper end of the armature is provided with a central bore to reduce the mass of the armature. A stylus tip or needle 9a is carried by the armature 9 at the lower end thereof, and is permanently attached to the armature.

For the purpose of holding the armature against displacement by the drag of the record on the stylus, but permitting free movement of the armature at right angles to the direction of the groove, the lower end of the armature is joined to the strap 7 by means of a resilient filament or wire 10 having its forward end embedded in and rigidly secured to the armature and its rear end turned upwardly and embedded in and rigidly secured to the strap 7. This spring element serves in maintaining the armature in a vertical position, and it also provides a restoring force, in addition to that provided by the disk 8, tending to maintain the armature centered with respect to the pole pieces. The spring 10 offers very little resistance to lateral movement of the armature, but prevents any appreciable movement in the direction of drag of the record on the needle. I prefer to include a small loop 10a in the spring 10 to permit a slight amount of compliance axially of the spring, and this seems to give sharper reproduction.

The operation of the pickup is believed to be obvious to those skilled in the art. When the stylus tip 9a engages the groove on a moving record of the lateral-cut type, the armature 9 is vibrated about a horizontal axis which is generally parallel with the groove and is located approximately within the plane of the disk 8, the exact position of the axis being determined jointly by the disk 8 and the spring 10. As the armature vibrates from one side to the other, the flux passing through the pickup coil by way of the armature is caused to vary and thereby induces a voltage in the coil.

Figure 7:
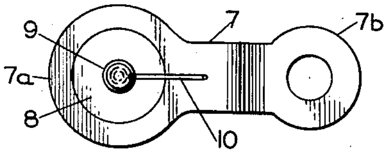
Figure 7 is a bottom view of the removable armature assembly of Figures 1 and 2.
Figure 8:
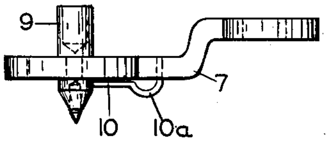
Figure 8 is a side elevational view of Figure 7.
Figure 9:
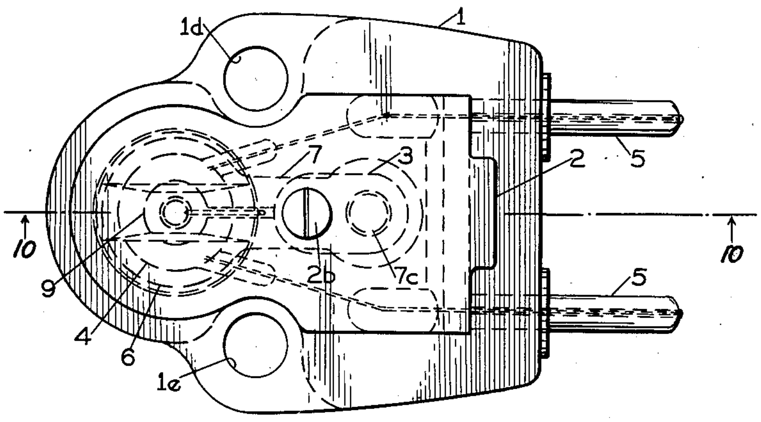

The removable armature and stylus mounting assembly is illustrated separately in Figures 7 and 8. If the stylus tip 9a becomes damaged, or if the disk 8 should become hardened or cracked or otherwise unsuitable, the armature mounting assembly may be removed and a new assembly replaced by simply removing one screw 7c which is readily available on the underside of the pickup head. It will be understood that the recess or cavity 1b formed in the lower face of the casing 1 closely conforms with the outline of the strap 7, and by this means the armature 9 is accurately positioned with respect to the pole pieces and the pickup coil. It will also be observed that the flexible disk 8 serves to seal the cavity containing the pole pieces and thereby prevents dirt and iron filings from entering the casing and lodging in the gaps between the pole pieces and the armature.

Figure 10:
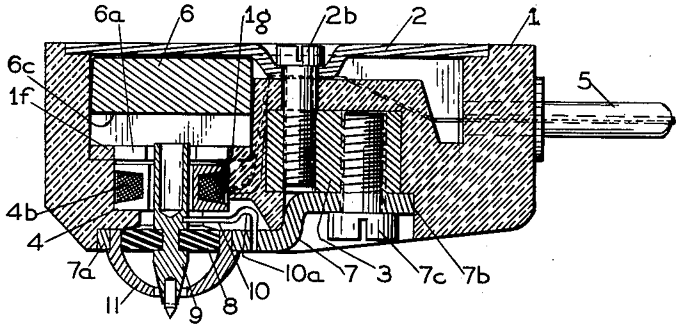
Figure 11:
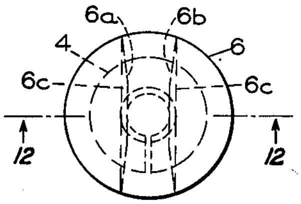
Figure 13:
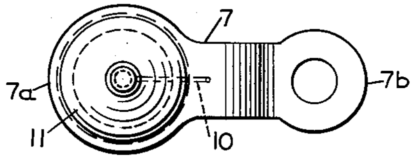
Figure 12:
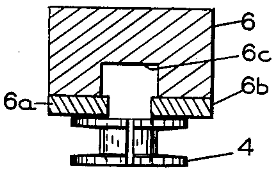
Figure 14:
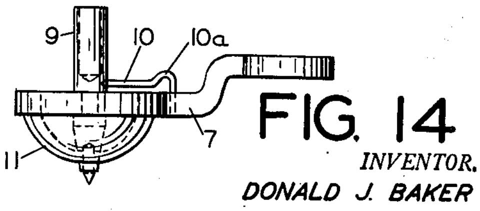

A second form of my invention is shown in Figures 9 to 14, inclusive, in which elements corresponding to those shown in Figures 1 to 8 are indicated by the same reference numerals. This arrangement differs from that shown in Figures 1 and 2 in that instead of having the winding spool 4 supported on the cover 2, the spool is mounted in a circular recess formed in the casing 1 concentric with the armature 9. Also, instead of having the magnet 6 mounted in the rear part of the casing, it is mounted immediately above the armature 9 and is round in shape as shown in Figure 11. The magnet is of inverted U-shape, see Figure 12, and a pair of soft iron pole pieces 6a and 6b are arranged in contact with the polar faces of the magnet, see Figure 12. The pole pieces 6a and 6b are of generally semi-circular shape and their opposing faces are broadly tapered as shown in dotted lines in Figure 11. These pole pieces are positioned above the spool 4, see Figure 10, and the upper end of the armature 9 extends into the gap between the pole pieces. The magnet 6 is located within a circular cavity formed in casing 1 immediately above the spool 4, and the magnet is oriented with its polar axis arranged transversely of the pickup head and is maintained in this position by means of a pair of bosses 1f and 1g extending upwardly from the bottom of the recess and into the channel 6c between the two arms of the magnet.

The removable armature assembly of Figures 9 to 14 is substantially the same as that shown in Figures 1 to 8, except that the spring member 10 is located above the supporting strap 7 instead of below it and is rigidly secured to the armature 9 at a point immediately above the flexible disk 8. Another feature of the assembly shown in Figures 6 to 14 is the provision of a protective shell 11 supported by the ring portion 7a of the strap 7 and surrounding the armature 9. This shell may be formed of a separate piece inserted in the ring 7 as shown in Figure 10, or it may be formed integrally with the strap 7, as by pressing the shell from the stock of the strap 7. The opening in the shell 11 provides clearance around the armature 9 sufficient to allow free movement of the armature in its normal operation, but the shell serves to prevent excessive deflection of the armature in case the armature should be deflected accidentally as by dropping the pickup head or by dragging it across the record.

Still another form of my improved pickup head is illustrated in Figures 15, 16 and 17. In this arrangement the pickup involves two winding spools 4 and 4' arranged within the casing 1 at the forward end thereof and on opposite sides of its fore-and-aft axis. These spools carry different sections 4a and 4a' of the pickup winding and are provided with magnetic cores 12 and 13 having inwardly and downwardly extending portions 12' and 13' forming spaced pole pieces between which the upper end of armature 9 is located.

The removable armature assembly is also different from that previously described and involves an armature frame formed of an elongated slotted portion 14a and a ring-shaped portion 14b. A permanent magnet 15 of round section is rigidly mounted within the ring-shaped portion 14b and extends upwardly into a circular cavity formed in the lower face of the casing 1. The magnet 15 and the attached armature frame 14a, 14b are secured in position in their appropriate cavities by means of a screw 16 passing through a central hole in magnet 15. The armature 9 is suspended within the slotted portion 14a of the armature frame by means of a relatively thin blade-like member 17 preferably formed of iron or other magnetic material and having its rear end rigidly secured in a slot formed in the lower end of the magnet 15. The armature 9 is secured to the blade 17 by any suitable means, such as by providing a sawcut in the upper end of the armature into which the end of the blade 17 extends and is secured by soldering or otherwise. The reed or blade 17 provides a support for the armature 9 which holds it rigidly against movement in a vertical direction but permits free movement laterally or transversely of the axis of the pickup. Any resonance effects which may develop within the reed 17 may be damped by inserting a pair of blocks of damping material (such as highly plasticized cellulose acetate) within the spaces between the blade and opposite arms of the frame 14a, as shown at 18 in Figure 15.

When the reed 17 is formed of magnetic material, it conducts magnetic flux from the lower end of the magnet 15 to the armature 9 where it is distributed between the pole pieces 12' and 13' in accordance with the movement of the armature. The magnetic flux passes upwardly through the cores 12 and 13 and returns to the upper end of the magnet through the non-magnetic paths indicated by the dotted lines 19 in Figure 16.

From the above description of Figures 15 to 17, it will be understood that the removable armature assembly includes the permanent magnet 15, and a completely new assembly may be substituted for a damaged assembly simply by removing the screw 16. As in the previous arrangements, the cavity in the lower face of casing 1 receiving the armature frame 14a—14b closely conforms with the shape of the frame and accurately positions the armature with respect to the pole pieces 12' and 13'.

Figures 18 and 19 illustrate a modified arrangement of the removable armature assembly shown in Figures 15 to 17. In this arrangement, the permanent magnet 15 is permanently located in casing 1 and does not form a part of the removable armature assembly. A disk of magnetic material 15a is secured within the ring portion 14b of the armature frame and engages the lower face of the magnet 15, and the screw 16 passes through a counterbored recess formed in the disk, whereby the armature frame is securely clamped in position by the screw 16. The reed 17 has its rear end secured within a sawcut formed in the disk 15a, and the remainder of the armature assembly is as described above for Figures 15 to 17. The disk 15a constitutes an extension of the magnet 15 and conducts the magnetic flux from the magnet to the blade 17. By this arrangement, it is not necessary to replace the permanent magnet when a new stylus is required.

Figure 19 shows the removable armature assembly in perspective, a section of the slotted portion 14a being broken away to show the armature 9. This figure also illustrates two slots formed on the inner faces of the slotted portion 14a for receiving the downwardly extending pole pieces 12' and 13', see Figure 17.

It will be noted that the resilient disk 8 which supports the armature in Figures 2 and 10 is of plate-like form, that is, it is flat and relatively thin. Also, while the most convenient form of this element is that of a circular disk, it may assume other shapes if desired.

From the foregoing it will be seen that in all forms of my pickup head, the casing encloses a magnetic structure including a pair of spaced pole pieces, and the casing is provided with an aperture located below the pole pieces through which the magnetic armature is supported by means of a mounting frame which is secured to the outside of the pickup casing by releasable means so that the armature may be removed from the head without opening the casing.

It is obvious that various changes may be made in the specific details of the structure without departing from the principle of my invention.

I claim:

1. A pickup head comprising a casing, magnetic structure enclosed in said casing including a pair of spaced pole pieces, said casing having an aperture formed in the lower wall thereof below said pole pieces and an elongated recess formed in the lower face of said wall and connected with said aperture, a magnetic armature, an elongated mounting frame for said armature positioned in and conforming in close-fitting relation with said elongated recess, resilient means at one end of said elongated frame for supporting said armature for pivotal movement about a transverse axis intermediate its ends, one free end of said armature extending into said casing and being centered between said pole pieces, and releasable fastening means securing said mounting frame to said head independently of said magnetic structure, whereby said armature may be removed from said head independently of said magnetic structure without opening said casing.

2. A pickup head according to claim 1 wherein said armature mounting frame is provided with a ring-shaped portion surrounding said aperture, and said armature is supported at the center of said ring-shaped portion by resilient means carried by said frame.

3. A pickup head according to claim 2 wherein said armature is supported on said frame by a disk of flexible material mounted in the ring-shaped portion of said frame.

4. A pickup head according to claim 3 and including a protective shell carried by said ring-shaped portion and surrounding the lower portion of said armature.

5. A pickup head according to claim 1 wherein said armature is supported on said frame by an elongated resilient member secured at one end to said frame and supporting said armature at the other end.

6. A pickup according to claim 1 and including a permanent magnet positioned within said casing and being secured to said armature frame and being removable from said casing with said frame.

7. A pickup head comprising a casing, magnetic structure enclosed in said casing including a pair of spaced pole pieces spaced from each other along a horizontal axis, said casing having an aperture formed in the lower wall thereof below said pole pieces, an elongated magnetic armature, a supporting frame for said armature comprising a rigid elongated member arranged in a horizontal direction at right angles to the horizontal axis of said spaced pole pieces and below the bottom wall of said casing, resilient means supporting said armature in a vertical position at one end of said horizontal member with one free end of said armature extending above said rigid member and into said casing and being centered between said pole pieces, said casing having fixed portions thereof engaging opposite sides of said elongated member in close fitting relation to prevent lateral shifting of said elongated member, and releasable fastening means securing said armature supporting frame in contact with the outer face of the lower wall of said casing independently of said magnetic structure, whereby said armature may be removed from said head independently of said magnetic structure without opening said casing.

8. A unitary assembly for a pickup head comprising a magnetic armature carrying a stylus at one end thereof, a mounting frame for said armature comprising an elongated strap having a ring-shaped portion at one end and an apertured portion at the other end, and resilient means mounting said armature upon said frame within said ring-shaped portion and with the two ends thereof extending away from opposite faces of said strap and at right angles thereto, said resilient means comprising a pivotal support for said armature intermediate the ends thereof whereby the two ends of said armature move in opposite directions.

9. An assembly according to claim 8 wherein said armature is supported upon said frame by a disk of flexible material positioned within said ring-shaped portion.

10. An assembly according to claim 8 wherein said armature is secured to said frame by an elongated resilient member secured to said frame at one end and secured to said armature at the other end.

11. An assembly according to claim 10 wherein said resilient member has a loop formed therein.

12. An assembly according to claim 8 and including a rigid shell secured to said ring-shaped portion and surrounding the stylus end of said armature.

13. An assembly according to claim 1 wherein the secured end of said elongated frame carries a magnetic member and said frame is slotted along its length, and said armature is mounted in a ring-shaped end portion of said frame by a resilient magnetic reed connected at one end to said magnetic member and supporting said armature at the other end thereof.

14. A vibration translating device comprising a magnet having an armature, a plate-like piece of resilient material fixed at an intermediate point of said armature, said armature having inner and outer ends extending outwardly from said plate-like piece, said outer end comprising a stylus support, said inner end being associated with said magnet, said armature being supported and carried by said plate-like piece for rocking movement about an axis at right angles to the axis of the armature and located within the boundary of said plate-like piece, and spring means connected to said armature for opposing tilting of said armature by drag of the record on said stylus, said spring means having greater compliance in directions laterally of such drag than in the direction of said drag.

15. A vibration translating device according to claim 14 comprising a casing for said magnet, a support for said plate-like piece and for said spring means and means for removably fastening said support and said casing together.

16. A vibration translating device comprising a magnet having a casing, a cover piece removably fitting over an opening in the bottom of said casing, said cover having an aperture therethrough, a wall of resilient material extending across and sealing off said aperture, an armature mounted in and carried by said wall, said armature having un-supported inner and outer ends extending to opposite sides of said wall, said outer end of said armature comprising a stylus support, and said cover fitting on said casing with the inner end of said armature in cooperative relation to said magnet, said wall comprising means supporting said armature for oscillation about an axis at right angles to the axis of the armature and lying within the boundary of said wall.

17. A vibration translating device comprising a magnet having a casing, a cover piece removably fitting an opening in the bottom of said casing, said cover having an aperture therethrough, a wall of resilient material extending across and sealing off said aperture, an armature mounted in and carried by said wall, said wall comprising means supporting said armature for oscillation about an axis at right angles to the axis of the armature and lying within the boundary of said wall, said armature having un-supported inner and outer ends extending to opposite sides of said wall, said outer end of said armature comprising a stylus support, and said cover fitting on said casing with the inner end of said armature in cooperative realtion to said magnet, and means connected to said armature for opposing the record drag and having compliance in the direction of record drag and laterally thereof, said means being connected in fixed relation to said cover.

18. A unitary assembly for a pickup device comprising an elongated armature carrying a stylus at one end thereof, a support having an aperture formed therein, a plate-like piece of flexible material carried by said support and closing said aperture, said plate-like piece having a central aperture formed therein and said armature being mounted within the aperture of said plate-like piece with the un-supported ends thereof extending on opposite sides of said plate-like piece, said plate-like piece of flexible material comprising means supporting said armature for oscillation about an axis at right angles to the axis of the armature and lying within the boundary of said plate-like piece, a resilient wire secured to said armature near one end thereof and extending transversely of said armature, and means rigidly securing the outer end of said wire to said support at a point beyond the edge of said plate-like piece.

DONALD J. BAKER.

REFERENCES CITED

The following references are of record in the file of this patent:

UNITED STATES PATENTS

| Number | Name | Date |
|---|---|---|
| 1,591,233 | Peterson | July 6, 1926 |
| 1,830,801 | McClatchie | Nov. 10, 1931 |
| 2,033,284 | Harrison | Mar. 10, 1936 |
| 2,037,165 | Harrison | Apr. 14, 1936 |
| 2,133,815 | Harrison | Oct. 18, 1938 |
| 2,161,489 | Vieth et al. | June 6, 1939 |
| 2,240,918 | Vermeulen | May 6, 1941 |
| 2,247,640 | Nielsen | July 1, 1941 |
| 2,388,116 | Bruderlin | Oct. 30, 1945 |
| 2,507,188 | Weathers | May 9, 1950 |
| 2,511,663 | Bachman | June 13, 1950 |
| 2,547,361 | Baker | Apr. 3, 1951 |
| 2,554,208 | Peterson et al. | May 22, 1951 |